United States Patent [19]

Barger et al.

[11] 4,345,193

[45] Aug. 17, 1982

[54] DRIVER FOR POSTAGE METERS

[75] Inventors: Danny R. Barger, Orange; Carl A. Eggert, Northridge; Paul O. Lloyd, Santa Ana, all of Calif.

[73] Assignee: Bell & Howell Company, Chicago, Ill.

[21] Appl. No.: 125,100

[22] Filed: Feb. 27, 1980

[51] Int. Cl.³ .............................................. G05B 5/01
[52] U.S. Cl. .................................... 318/612; 318/625; 318/640; 318/646; 177/4; 177/13; 364/466; 346/10; 235/101
[58] Field of Search .................. 318/14, 15, 612, 640, 318/646, 625; 364/466; 177/4, 10, 11, 13; 346/9, 10, 11, 12; 235/101

[56] References Cited

U.S. PATENT DOCUMENTS

| | | | |
|---|---|---|---|
| 4,090,063 | 5/1978 | Martin | 235/101 |
| 4,119,161 | 10/1978 | Price et al. | 177/13 |
| 4,129,815 | 12/1978 | Argentine et al. | 318/15 |
| 4,216,422 | 8/1980 | Divjak et al. | 318/612 |

*Primary Examiner*—J. V. Truhe
*Assistant Examiner*—Eugene S. Indyk
*Attorney, Agent, or Firm*—Lyon & Lyon

[57] ABSTRACT

A driver for positioning the postage amount handles of a postage meter, the driver including motors which, in response to control signals from a postage computer, axially displace shafts along paths generally parallel to the paths of the postage meter handles. The shafts support actuator fingers which couple the shaft movement to the respective handles. An optical interruptor for each shaft senses various shaft positions and provides signals to the postage computer which are used in part to develop the control signals.

3 Claims, 10 Drawing Figures

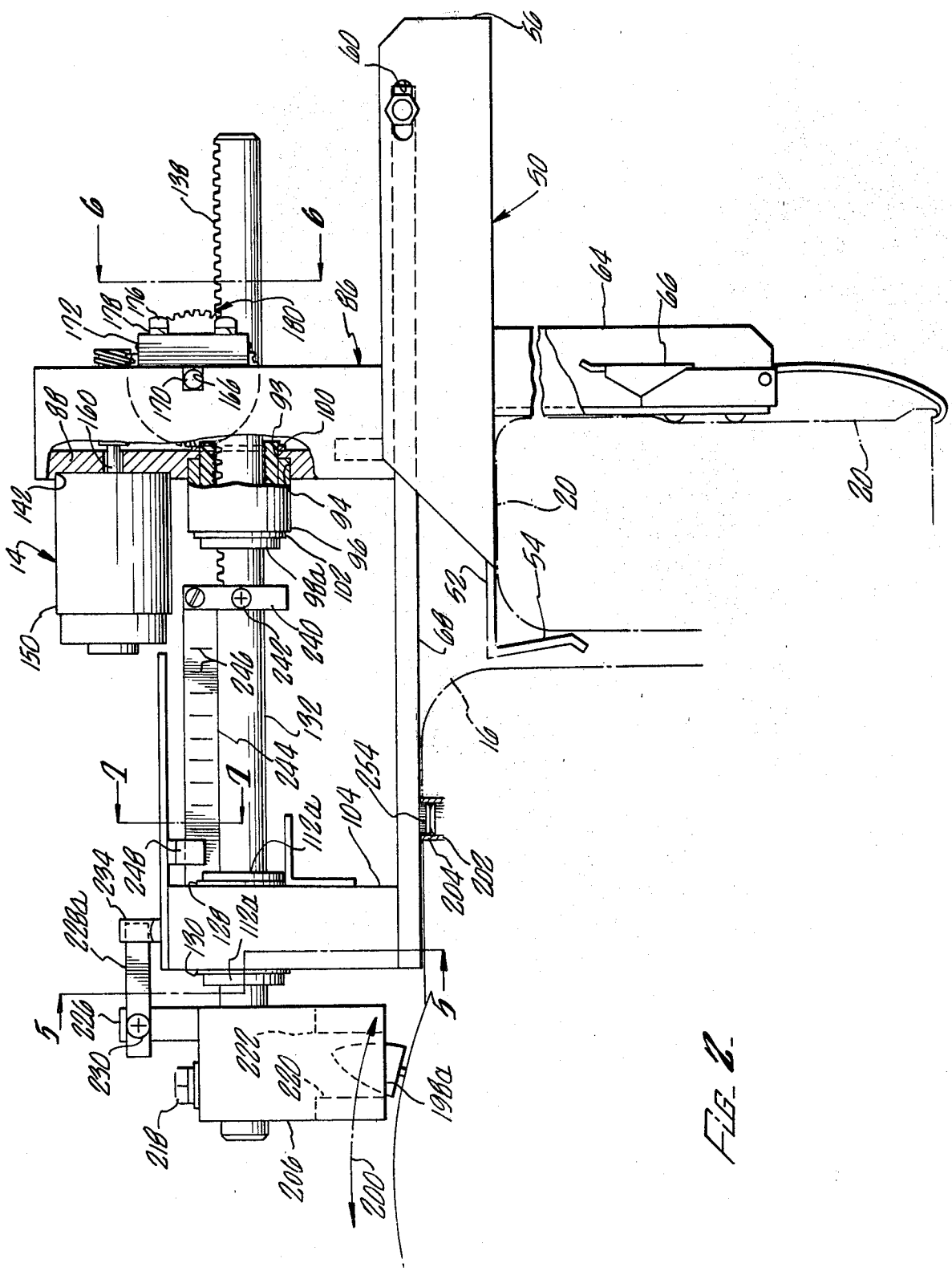

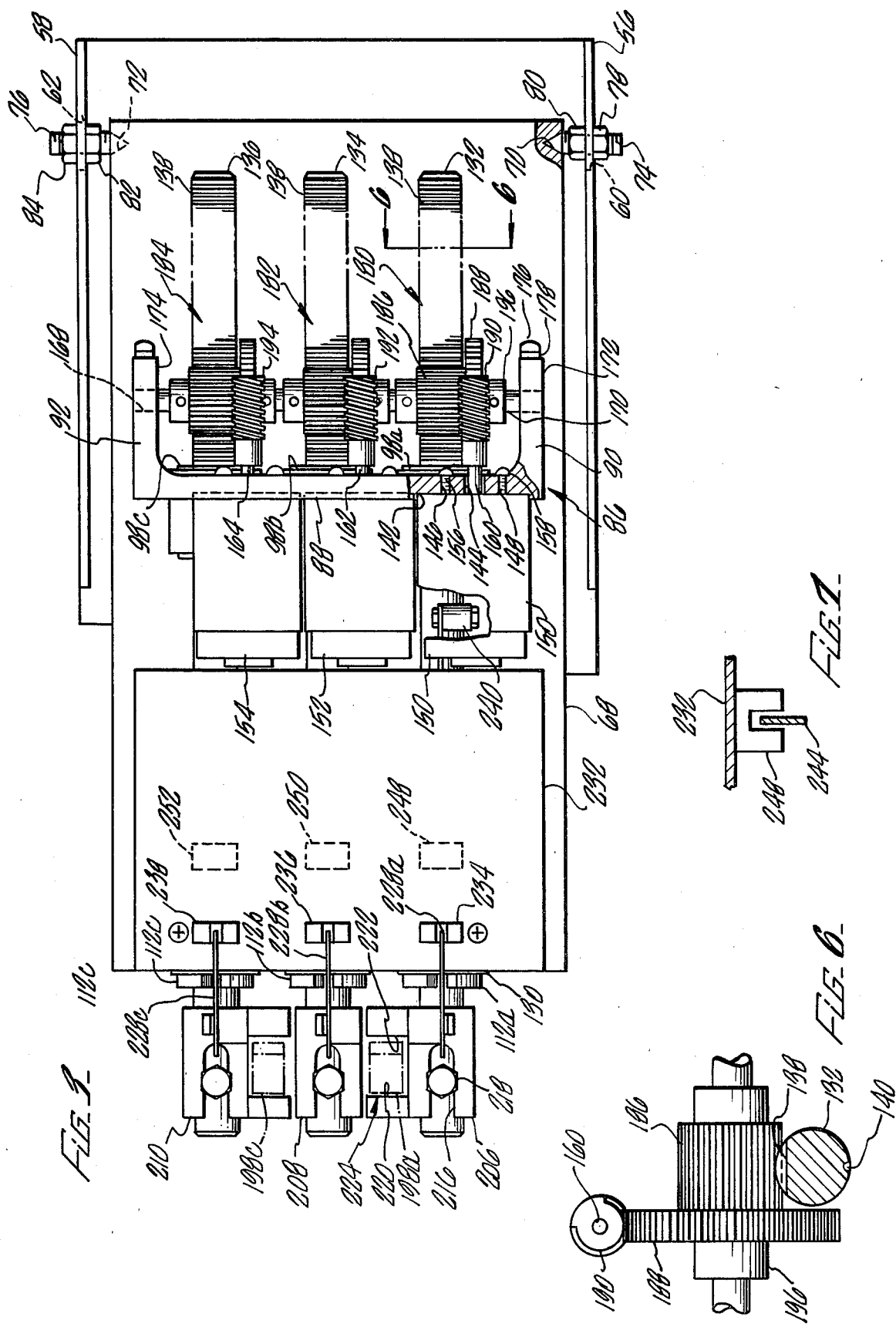

DRIVER FOR POSTAGE METERS

BACKGROUND OF THE INVENTION

Reference is made to copending application Ser. No. 125,099, now U.S. Pat. No. 4,319,328, filed concurrently herewith in the name of Carl A. Eggert entitled "Postage Cost Recording System", said application being assigned to the same assignee as the present invention the disclosure of which is hereby incorporated by reference.

The present invention relates generally to postal weighing, computing and metering devices and more particularly to a driver for positioning the postage amount handles of a postage meter.

Automated mailing systems which may include electric postage scales and postage computers are used to weigh an item and to compute the shipping costs for the item according to such factors as destination and special services or handling which may be desired. Typically, where such systems are used, the shipping amount is manually transferred to a postage meter which prints a postage legend onto the item or which prints the postage legend onto a label that is then affixed to the item. Such postage meters generally include a plurality of postage amount handles that are positioned at specified locations along slightly arcuate paths to thereby adjust the amount which the meter is to print.

It is desirable to accomplish the entire weighing, computing and printing process as quickly and accurately as possible where, for example, large numbers of items must be quickly prepared for shipping. To provide this speed, a meter driver responsive to the postage computer may be employed to automatically position the postage amount handles.

One such postage meter driver is disclosed in U.S. Pat. No. 4,129,815 to Argentine, et al. The meter driver disclosed therein includes stepping motors that drive lead screws which in turn advance or retract drive shoes along guide slots. The drive shoes engage the postage amount handles and position encoders provide signals which indicate the positions of the shoes and thus the handles. This driver, however, employs reversible synchronous stepping motors which are relatively expensive and which require generally complex control circuits. Additionally, lead screws are relatively expensive and difficult to machine and the combination of the stepping motors with the lead screws provide high torque values that can damage the postage meter or the meter driver. Furthermore, the position encoder includes a plurality of conductive wipers that slide along conductive contacts and is therefore subject to undesirable contact bounce, noise and mechanical wear.

SUMMARY OF THE INVENTION

The postage meter driver of the present invention provides fast, accurate response to control signals from a postage computer yet does not develop operating torques or forces that may damage the postage meter or the meter driver. In an exemplary embodiment, the meter driver includes DC motors which, in response to control signals from the postage computer, operate through a rack and pinion means to axially displace shafts along paths which are generally parallel to the paths described by the postage amount handles of the postage meter. The shafts carry actuator fingers which engage the postage amount handles and which thus displace the handles according to the axial placement of the shafts. Optical interrupters sense shaft displacement and provide signals accordingly to the postage computer. The optical interrupters eliminate the disadvantages associated with mechanical contacts and conductive wipers.

It is thus an object of the present invention to provide an improved postage meter driver.

It is another object of the present invention to position the postage meter amount handles with actuator fingers carried by axially displaced shafts.

It is a further object of the present invention to axially displace shafts with motors through rack and pinion means.

BRIEF DESCRIPTION OF THE DRAWINGS

The invention, including further objects and advantages thereof, may be better understood by referring to the following detailed description of an embodiment of the invention taken in conjunction with the accompanying drawings in which:

FIG. 2 is a side view of a preferred embodiment of a postage meter driver according to the present invention.

FIG. 3 is a top view of the meter driver of FIG. 2.

FIG. 6 is a side view of a portion of the drive mechanism of the meter driver of FIG. 2 taken substantially along the lines 6—6 of FIGS. 2 and 3.

FIG. 7 is a view of a shaft position optical interrupter of the meter driver of FIG. 2 taken substantially along the lines 7—7 of FIG. 2.

DETAILED DESCRIPTION OF THE INVENTION

Figure 1:
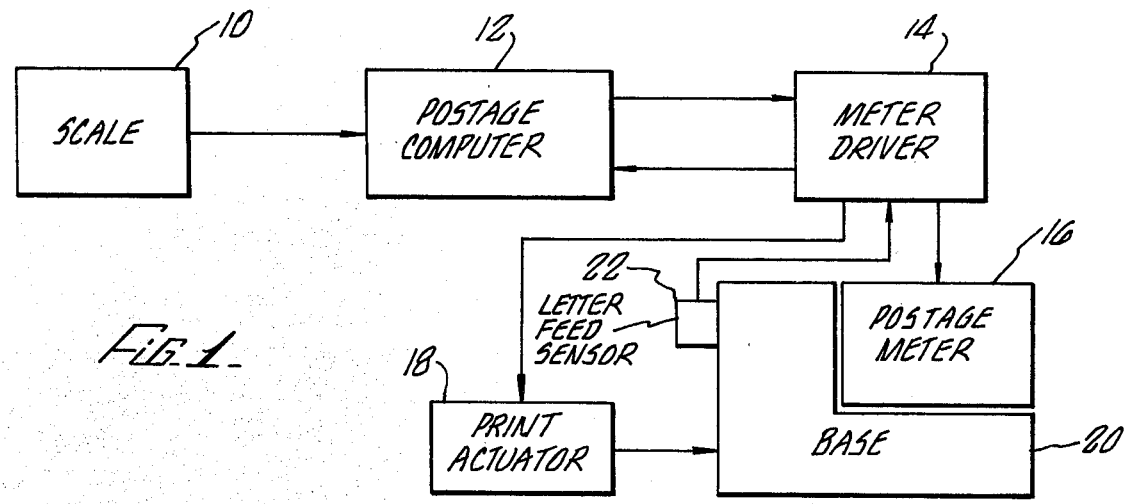
FIG. 1 is a block diagram of a mailing system employing a meter driver according to the present invention.

Referring now to FIG. 1, a mailing system typically includes an electronic scale 10 onto which various items to be shipped are placed. The scale 10 provides a signal proportional to the weight of the item to a postage computer 12. The computer 12, in response to the signal from the scale 10, and further in response to various other factors entered by an operator such as, for example, the destination of the item, the shipping class, and any special services that are desired, calculates the shipping cost for the item. This cost may be displayed by the postage computer 12 by means of a conventional digital display. The postage computer 12 additionally provides drive signals to a meter driver 14 which in turn operates postage amount handles of a postage meter 16. The postage meter 16 may, for example, be one of the Pitney-Bowes R series.

The meter driver 14 provides signals to the postage computer 12 according to the position of the postage amount handles. When the postage computer 12 determines that the postage amount handles are set to the correct shipping cost, the postage computer 12 removes the drive signals from the meter driver 14. The postage computer 12 then applies a stamp signal to the meter driver 14 which in turn applies a signal to a print actuator 18. The print actuator 18 operates a print lever associated with a base 20 which causes a postage legend bearing the correct shipping amount to be printed onto a label. The base 20 typically supports the postage meter 16 and may be, for example, one of the Pitney-Bowes 4,000 series. Once the print operation is completed, the postage computer 12 may provide reverse drive signals to the meter driver 14 to return the postage amount handles of the postage meter 16 to a home or zero position. As is described below, the postage amount handles may alternatively remain at the shipping amount and may be repositioned by the meter driver 14 in response to the postage computer 12 when different shipping costs for another item are calculated.

A letter feed sensor 22 associated with the base 20 senses the passage of an item through the postage meter 16 and the base 20 and provides a signal in response thereto to the meter driver 14 and in turn to the postage computer 12. This signal updates a postage report generator within the postage computer 12. Suitable letter feed sensors are more fully described in the previously referenced co-pending application Ser. No. 125,099.

The meter driver 14 (FIG. 2) includes a mounting bracket 50 which is adapted to clip to the base 20. The bracket 50 includes a generally rectangular base portion 52 and a clip portion 54 formed at one end of the base portion 52. The bracket 50 further includes vertical support members 56 and 58 (FIG. 3) which extend vertically from opposite edges of the base portion 52. Formed into the vertical support members 56 and 58 are two horizontal elongated adjustment slots 60 and 62, the purpose of which is subsequently described. The slots 60 and 62 are formed adjacent to an end of the base portion 52 that is opposite from the end of the base portion 52 from which the clip portion 54 depends. Affixed to the bottom of the base portion 52 is a vertical support member 64. A latch 66 is disposed at the lower extension of the support member 64.

The bracket 50 and thus the meter driver 14 is easily removably affixed to the base 20 by positioning a portion of the base 20 against the bottom surface of the base portion 52 and between the clip portion 54 and the vertical support member 64. The latch 66 is then operated to grip an edge portion of the base 20 to thereby removably secure the meter driver 14 to the base 20.

The meter driver 14 includes a generally rectangular base plate 68. Formed into opposite edges of the base plate 68 at a first end thereof are two generally cone-shaped bores 70 and 72 (FIG. 3). The bores 70 and 72 receive two cone-point set screws 74 and 76 which are adjustably retained within the slots 60 and 62 by two pairs of nuts 78-80 and 82-84. The set screws 74 and 76 may be laterally and axially adjustable within the slots 60 and 62 to thus adjust the position of the base plate 68 and the remaining portions of the meter driver 14 with respect to the bracket 50, the meter 16 and the base 20. The cone shape of the bores 70 and 72 and the corresponding cone-point shape of the tips of the set screws 74 and 76 cooperate to form a hinge that allows the base plate 68 and the remaining portions of the meter driver 14 to be rotated about an axis defined by the set screws 74 and 76. This rotation provides access to the portions of the meter 16 and the base 20 which are otherwise covered when the meter driver 14 is operationally positioned against the meter 16.

With continued reference to FIGS. 2 and 3, a U-channel member 86 extends generally perpendicularly from the upper surface of the base plate 68. The member 86 includes a support portion 88 and two leg portions 90 and 92 which together define the U-shape. Three openings 93 are formed through the support portion 88 and the central axes of these openings 93 lie in a plane generally parallel to the base plate 68. The openings 93 are equally spaced horizontally along the support portion 88. Three recesses 94 are formed into the outer surface of the support portion 88 coaxially with the openings 93 and the recesses 94 each receive a cylindrical tubular spacer 96. Each of the spacers 96 carries a suitable linear bearing 98$a$-$c$ such as a Thomson Super 8. Two retaining rings 100 and 102 retain the bearings 98$a$-$c$ within the spacers 96 and in turn secure the bearings 98$a$-$c$ and the spacers 96 within the openings 93 and the recesses 94 of the support portion 88. In an embodiment of the meter driver 14 as illustrated in FIGS. 2 and 3, the central axes of the bearings 98$a$-$c$ define a plane substantially parallel to the base plate 68.

A support member 104 (FIG. 2) is disposed perpendicular to the upper surface of the base plate 68 at an end of the base plate 68 which is opposite to the end into which are formed the bores 70 and 72 (FIG. 3). The support member 104 is generally parallel to the support portion 88 of the member 86. Three openings 106 (FIG. 5) are formed through the support member 104, the central axis of each opening 106 being coaxial with the axis of the respective bearing 98-$c$. A slot 108 is formed through the upper surface of the support member 104 for each of the openings 106. The slots 108 are generally perpendicular to the base plate 68 and define parallel vertical planes 110 in which lie the central axes of the openings 106.

Figure 5:
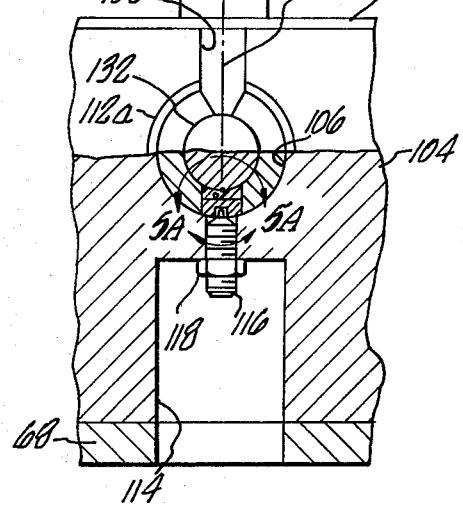
FIG. 5 is a generally cross-section view of the meter driver of FIG. 2 taken substantially along the lines 5—5 of FIG. 3.
Figure 5A:
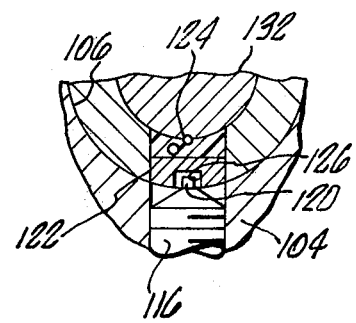
FIG. 5A is an enlarged portion of FIG. 5 taken substantially along the line 5A.

Disposed within the openings 106 are conventional slotted linear bearings 112$a$-$c$ such as Thomson Super 8 KOPN (FIGS. 3 and 5). The slots within the bearings 112$a$-$c$ are aligned with the slots 108. It is thus to be noted that the bearings 112$a$-$c$ supported by the support member 104 are coaxially aligned with the bearings 98$a$-$c$ respectively. The bearings 112$a$-$c$ can be each secured within the openings 106 by means of C-rings 128 and 130.

Formed through the base plate 68 (FIG. 5) and into the lower surface of the support member 104 are three vertical access bores 114. A bore 114 is provided underneath each of the openings 106. Threaded through the upper surface of the bores 114 are set screws 116 which are secured by means of jam nuts 118. Projecting portions 120 extend from the tips of the screws 116. The bearings 112$a$-$c$ include race adjustment plates 122 which can be used to adjust the distance between corresponding linear ball bearing races 124 and the central axes of the bearings 112$a$-$c$. The race adjustment plates 122 include outer grooves 126 which are adapted to receive the projecting portions 120 of the screws 116. By adjusting the set screws 116 and the jam nuts 118, the position of the race adjustment plates 122 and the linear ball bearing races 124 are adjusted with respect to the central axes of the bearings 112$a$-$c$.

Three shafts 132, 134 and 136 (FIG. 3) are carried within coaxially aligned pairs of the bearings 98$a$-$c$ and 112$a$-$c$. Each of the shafts 132, 134 and 136 includes a generally circular cross-section (FIG. 6) and includes a rack 138 formed into a flattened upper surface. A groove 140 is formed longitudinally along a surface portion of each of the shafts 132–136 opposite from the racks 138. The set screws 116 (FIG. 5) are adjusted to urge the race adjustment plates 122 and the linear ball bearing races 124 so that the races 124 engage the grooves 140, thus preventing twisting of the shafts 132–136.

Formed into the support portion 88 (FIGS. 2 and 3) of the U-channel member 86 are three circular recesses 142 generally above and slightly horizontally offset relative to the respective three recesses 94. Three openings 144s are formed through the support portion 88 concentrically with the recesses 142 and two openings 146 and 148 are formed through the support portion 88 within each of the recesses 142 on either side of the openings 144. Three motors 150, 152 and 154 are secured within the recesses 142 by means of screws 156 and 158 passing through the openings 146 and 148 respectively. The openings 146 and 148 may be slightly oversized to allow adjustment of the respective motors 150, 152 and 154. Each of the motors 150–154 includes a shaft 160, 162 and 164 which passes through one of the openings 144. The motors 150–154 are preferably DC motors such as Model No. 313a102-8 manufactured by TRW Globe Motor Division.

Two square channels 166 and 168 are formed into an outer edge of the leg portions 90 and 92 of the U-channel member 86 (FIGS. 2 and 3). The channels 166 and 168 are adapted to receive circular shaft 170. Two shaft clamp bars 172 and 174 are secured by a plurality of screws and lock washers 176–178 over the channels 166 and 168 to thereby clamp the shaft 170 within the channels 166 and 168.

Three gear assemblies 180, 182 and 184 (FIG. 3) are carried by the shaft 170. Each of the assemblies 180–184 includes a pinion gear 186 (FIG. 6) to which is affixed a spur gear 188 and each of the motor shafts 160–164 carries a worm gear 190, 192 and 194 which engages the spur gear 188 of the assemblies 180–184. A plurality of collars 196 adjustably retain the gear assemblies 180–184 along the shaft 170 to position the spur gears 188 of the respective assemblies 180–184 beneath the corresponding worm gears 190–194. The motors 150–154 may be adjusted by loosening the screws 156 and 158 to ensure proper engagement of the worm gears 190–194 with the spur gears 188. The pinion gears 186 of the gear assemblies 180–184 engage the racks 138 (FIG. 6) of the respective shafts 132, 134 and 136 (FIG. 3).

When the motors 150–154 are operated in response to control signals from the postage computer 12 as is described below with reference to FIGS. 8 and 9, the motors 150–154 through the worm gears 190–194 rotate the gear assemblies 180–184 to thereby axially displace the shafts 132–136 along paths defined by the coaxial alignment of the bearings 98a–c and 112a–c.

Figure 4:
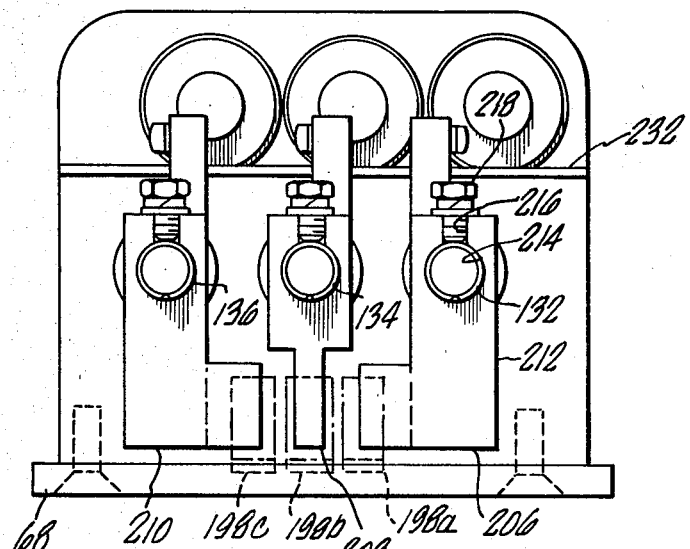
FIG. 4 is an end view of the meter driver of FIG. 2.

With respect to the postage meter 16, a meter such as one of the Pitney-Bowes R series typically includes a plurality of postage amount handles 198a–c (FIGS. 2 and 4) which are moved along slightly arcuate paths 200 to thereby select the required postage amount. Each of the handles 198a–c corresponds to a respective digit that appears in the postage legend printed by the meter 16 which may be, for example, cents, tens of cents, or dollars. The handles 198a–c are typically moved to one of ten positions along the respective arcuate path 200 to thereby adjust the postage amount for the corresponding digit from zero to nine. A spring-loaded detent mechanism within the postage meter defines the specific locations to which the postage amount handles can be set in order for the meter to operate properly. The postage meter 16 typically also includes a button 202 which travels within a cylindrical guide 204. The button 202 must be depressed when the postage meter 16 is to print a postage legend of one dollar or more.

Continuing now with the description of the meter driver 14, three actuator fingers 206, 208 and 210 (FIGS. 2–4) are secured to an end of the shafts 132–136 respectively. The actuator fingers 206–210 include body portions 212 through which are formed circular openings 214 adapted to receive the respective shafts 132, 134 or 136. Elongated slots 216 are formed from the upper surface of the body portions 212 to the openings 214. Three screws 218 are threaded into the slots 216 and may be tightened against the respective shafts 132–136 to thereby adjustably secure the actuator fingers 206–210 thereto.

Projecting from a lower side of the body portion 212 of the actuator finger 206 are two members 220 and 222 (FIG. 3) which together form a jaw 224. The facing surfaces of the members 220 and 222 define an area which receives one of the postage amount handles 198a. The distance between these facing surfaces of the members 220 and 222 (FIG. 2) is greater than the width of the respective handle 198a, thus providing gaps between the facing surfaces of the members 220–222 and the handle 198a. The actuator fingers 208 and 210 include members that are similar to the members 220 and 222 just described for the actuator finger 206 and which receive the handles 198b–c respectively.

A vertical support portion 226 (FIG. 2) extends from the upper surface of the actuator finger 206. A flag 228a is adjustably affixed to the support portion 226 by a screw 230. The purpose of the flag 228a is described subsequently. The remaining actuator fingers 208 and 210 include vertical support portions, flags 228b–c and screws similar to those just described for the actuator finger 206.

A circuit card 232 is affixed to the upper surface of the support member 104 (FIGS. 2 and 3). Three optical interrupters 234, 236 and 238 extend upwardly from the upper surface of the circuit card 232. Each of the optical interrupters 234–238 defines a channel which receives one of the flags 228a–c and provides output signals indicating the presence or absence of the respective flag 228a–c within the channel. The optical interrupters 234–238 may be a type TIL 144 available from Texas Instruments, Inc.; and known as optoelectronic encoder assemblies.

A block 240 (FIGS. 2 and 3) is secured to the shaft 132 by a screw 242 and the block 240 secures an optical strip 244 to the shaft 132. The strip 244 is disposed vertically atop the shaft 132 and is generally parallel to the central axis of the shaft 132. The strip 244 can be, for example, a length of photographic film which is generally opaque but which includes a plurality of vertical translucent slots 246. The photographic film can be laminated between thicknesses of clear film to prevent scratching of the photographic image. The optical strip 244 passes through an optical interrupter 248 (FIG. 7) which is fixed to the lower surface of the circuit card 232. The strip 244 also passes through one of the slots 108 and the slot of the bearing 112a. The optical interrupter 248 is similar to the optical interrupters 234–238 and provides output signals responsive to the presence of the translucent slots 246 within the optical interrupter 248. The translucent slots 246 are spaced along the optical strip 244 to provide output signals from the optical interrupter 248 indicative of various positions of the shaft 132, the actuator finger 206 and thus the postage amount handle 198a. Similar optical strips are provided for each of the shafts 134 and 136. Two optical interrupters 250 and 252 provide output signals in a manner similar to that of the optical interrupter 248 which indicate the position of the respective shafts 134 and 136 and therefore the handles 198b–c.

A screw head 254 (FIG. 2) projects from the lower surface of the base plate 68 and is adapted to be received within the guide 204 of the postage meter 16. The screw 254 thus depresses the button 202 and also provides an accurate reference point between the postage meter 16 and the meter driver 14.

The postage computer 12 (FIG. 1) generates various control signals for the meter driver 14 and also responds to various feedback signals therefrom. It will be understood by those skilled in the art that the postage computer 12 may include a microcomputer which with suitable programming implements the functions described with reference to FIG. 8. The postage computer 12 includes a postage calculator 300 (FIG. 8) which, in response to the signal from the scale 10 and various operator inputs such as destination and class from a keyboard 301, calculates the correct shipping charges for an item. The postage calculator 300 provides signals proportional to this calculated amount in dollars, tens of cents and cents to three comparators 302, 304 and 306 respectively. Three pulse counters 308, 310 and 312 provide a second input to the comparators 302, 304 and 306. When the dollar comparator 302 detects that the output from the counter 308 is less than the output from the postage calculator 300, the comparator 302 applies a signal to a dollars control signal generator 314 which in turn generates a forward drive signal that is applied to the meter driver 14. Similarly, the comparators 304 and 306 provide signals to two control signal generators 316 and 318.

The postage calculator 300 also generates a select signal which is applied to the meter driver 14. This select signal allows the postage computer 12 to select between, for example, two meter drivers and thus allows one of two postage meters to be operated according to the least expensive shipping means available. As a further example, two meter drivers may provide a choice between shipping via U.S. Postal Service (USPS) or United Parcel Service (UPS).

Figure 8:
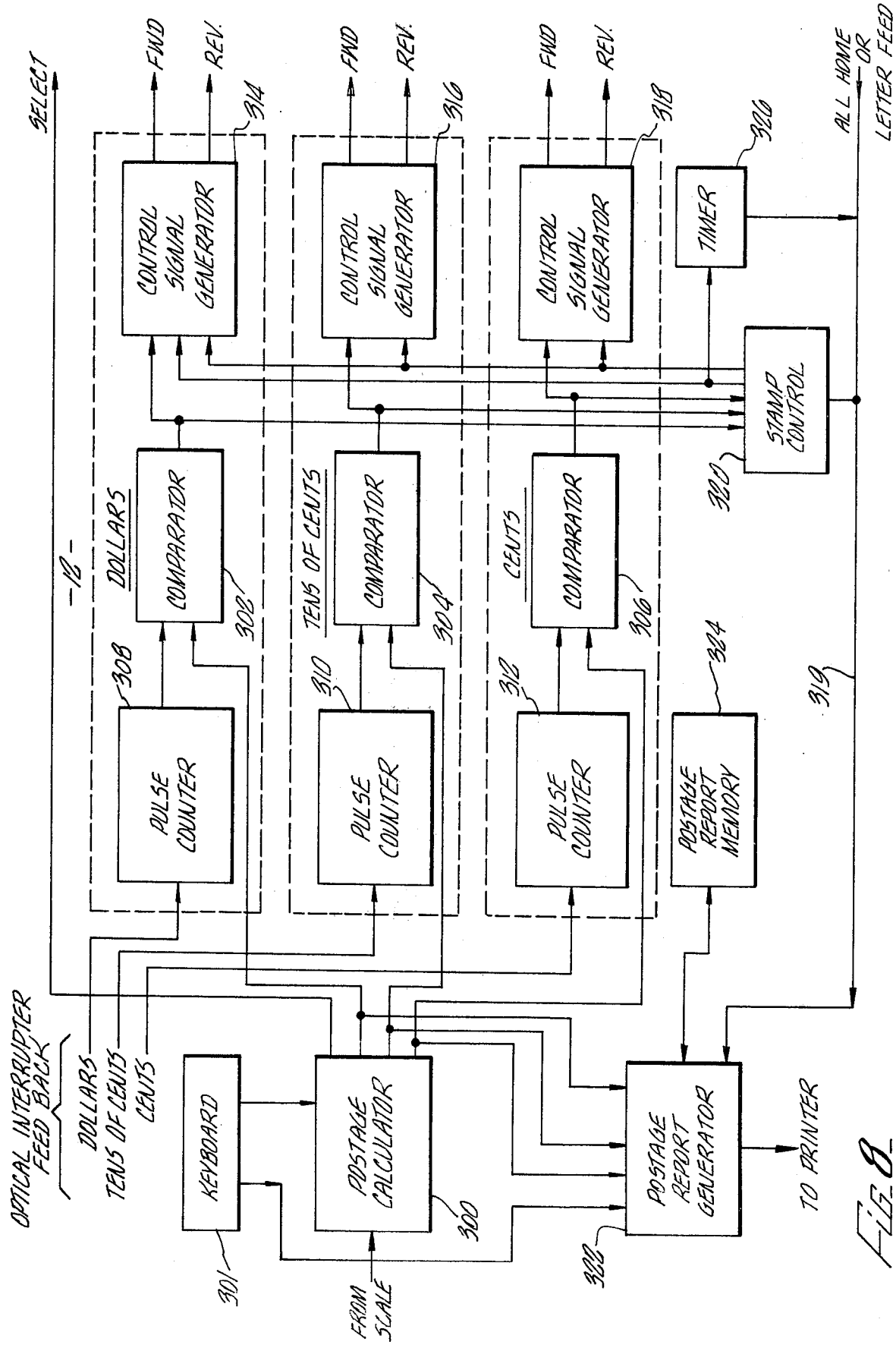
FIG. 8 is a block diagram of the meter driver control functions performed by the postage computer of FIG. 1.
Figure 9:
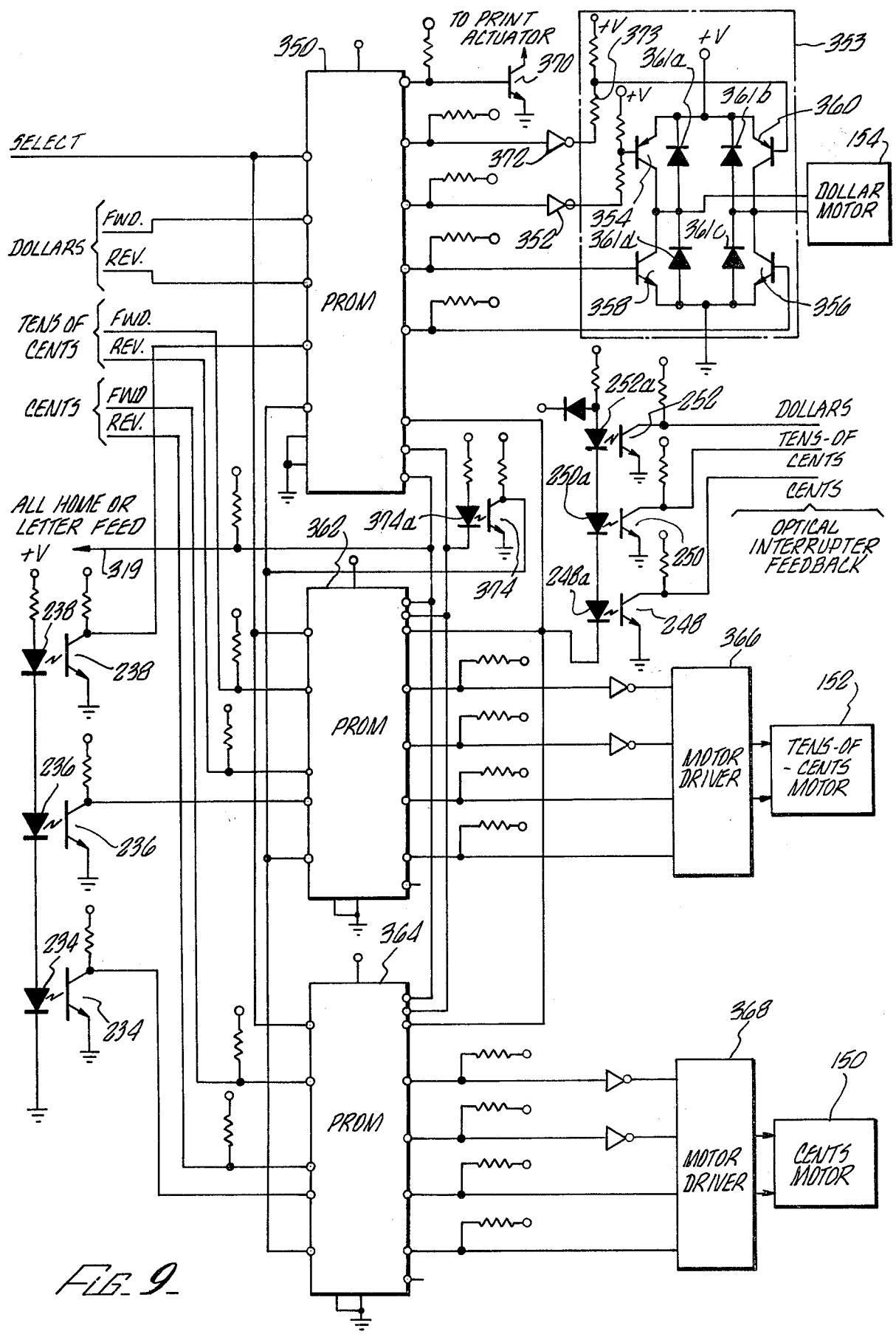
FIG. 9 is a schematic diagram of the drive circuitry of the meter driver of FIG. 2.

With reference now to FIGS. 8 and 9, the forward signal from the dollars control signal generator 314 and the select signal are applied to a first programmable read only memory (PROM) 350. The PROM 350 in response to this forward signal and to the select signal, provides an enabling substantially ground level signal to series-connected light emitting diodes (LEDS) 248a–252a of the optical interrupters 248–252 and to an LED 374a of an optoelectronic emitter/sensor assembly 374. The LEDs 248a–252a and 374a are in turn connected to a suitable supply voltage. The PROM 350 also provides an output through an invertor 352 to a motor driver circuit 353. More particularly, the signal from the inverter 352 is applied through a resistor 355 to the base of a PNP transistor 354. The PROM 350 also applies a signal to the base of an NPN transistor 356. The emitter of the transistor 354 is connected to a suitable voltage supply +V and the collector of the transistor 354 is connected to one terminal of the motor 154. The collector of the transistor 354 is also connected to the collector of an NPN transistor 358, the emitter of which is connected to ground. The collector of the transistor 356 is connected to a second terminal of the motor 154 and the emitter of the transistor 356 is connected to ground. The collector of the transistor 356 is also connected to the collector of a PNP transistor 360, the emitter of which is connected to +V.

The anode of a diode 361a is connected to the collectors of the transistors 354 and 358 and to the first terminal of the motor 154. The cathode of the diode 361a is connected to the emitter of the transistor 354, to the emitter of the transistor 360 and to +V. The anode of a similar diode 361b is connected to the collectors of the transistors 356 and 360 and to the second terminal of the motor 154. The cathode of the diode 361b is also connected to the emitters of the transistors 360 and 354, to +V, and to the cathode of the diode 361a. The anode of a diode 361c is connected to the emitter of the transistor 356, to ground and to the emitter of the transistor 358. The anode cathode of the diode 361c is connected to the second terminal of the motor 154 and to the collectors of the transistors 356 and 360. The anode of a similar diode 361d is connected to the emitters of the transistors 356 and 358 and to ground. The cathode of the diode 361d is connected to the first terminal of the motor 154 and to the collectors of the transistors 358 and 354. Thus it is seen that, in effect, the diodes 361a–d are connected across the transistors 354, 360, 356 and 358 respectively.

With the signals applied from the PROM 350 to the transistors 354 and 356, the transistors 354 and 356 conduct current and the motor 154 rotates in a first direction. This rotation is applied through the worm gear 194 (FIG. 3) and the gear assembly 184 and causes the shaft 136 and the finger actuator 210 to be displaced in a first direction. The corresponding postage amount handle 198c is thus displaced along its path 200.

As the shaft 136 is displaced, the optical interrupter 252 (FIGS. 3 and 9) provides an output pulse as each of the translucent slots of the optical strip 244 passes through the interrupter 252. For example, when the handle 198c nears its one position, the optical interrupter 252 provides a pulse to the pulse counter 308 (FIG. 8) which increments the counter 308 which had been previously cleared. If, for example, the postage calculator 300 provides a signal corresponding to three to the comparator 302, then with the third pulse applied to the counter 308, the comparator 302 and the control signal generator 314 remove the forward signal from the PROM 350. In response to this, the PROM 350 removes th signal from the transistor 354 and provides a control signal to the base of the transistor 358 and to the base of the transistor 356. The transistors 356 and 358 short the terminals of the motor 154 and thereby cause the motor 154 to operate as a shorted generator to quickly brake the shaft 164 rotation and to thus halt the displacement of the shaft 136 and the actuator finger 210. The actuator finger 210 is adjusted on the shaft 136 such that, when the shaft 136 is stopped, the handle 198c is allowed to be freely positioned by the meter 16 detent mechanism, thereby substantially reducing the likelihood of the meter 16 malfunctioning.

The diodes 361c–d provide paths for the current generated by the motor 154 when braking signals are applied to the transistors 356 and 358 to protect the respective transistors from back electromotive force generated by the motor 154. For example, one such current path may be from ground, through the diode 361d, the motor 154, and the transistor 356 again to ground.

The signals from the control signal generators 316 and 318 are applied to a second and a third PROM 362 and 364. The outputs of the PROMS 362 and 364 are connected to two motor drive circuits 366 and 368 which are substantially similar to the drive circuit 353 previously described. The circuits 366 and 368 in turn drive the motors 152 and 150 (FIGS. 3 and 9). The optical interrupters 250 and 248 provide feedback pulses to the pulse counters 310 and 312 respectively (FIG. 8). Thus the motors 152 and 150 are operated simultaneously with the motor 154 to position the shafts 134 and 132, the actuator fingers 208 and 206, and the handles 198*b* and 198*a* as previously described.

The outputs from the comparators 302–306 (FIG. 8) are also applied to a stamp control 320. When these outputs indicate that the handles 198*a–c* are properly positioned, the stamp control 320 generates a first signal which is applied to the dollars control signal generator 314. In response to this signal, the generator 314 provides forward and reverse signals to the input of the PROM 350 (FIG. 9) and the PROM provides an output to a transistor 370 which energizes the print actuator 18 (FIG. 1). At the end of a time period that allows the postage meter 16 and the base 20 to perform the required print operation, the stamp control 320 provides a second output signal to the control signal generators 314, 316 and 318 which in turn apply reverse signals to the respective PROMS 350, 362 and 364. The PROM 350, in response thereto, provides a control signal through an invertor 372 and a resistor 373 to the base of the transistor 360 and also provides a signal to the base of the transistor 358. These transistors 360 and 358 apply reversing voltage to the motor 154, causing the motor 154 to reverse rotational direction and thus displacing the shaft 136 (FIG. 3), the actuator finger 310 and the knob 198*c* in a second and opposite direction. When the actuator finger 210 positions the handle 198*c* at its zero position, the flag 228*c* is detected by the optical interrupter 238 which provides a signal to the PROM 350 (FIG. 10). The PROM 350 then removes the signal from the transistor 360 and provides output signals to the bases of the transistors 356 and 358, thus braking the motor 154 to a stop.

The stamp control 320 and the control signal generators 316 and 318 similarly simultaneously control the motors 152 and 150 to return the handles 198*b* and 198*a* to the zero digit positions. When the optical interrupters 234, 236 and 238 all indicate that the handles 198*a–c* have returned to the zero digit positions, the PROMS 364, 362 and 350 provide an all home output signal to the stamp control 320 and to a postage report generator 322 on the line 319. The stamp control 320 then removes the second output signal applied to the control signal generators 314, 316 and 318 which then remove the reverse signals from the PROMS 350, 362 and 364. With neither forward nor reverse signals applied to the PROMS 350, 362 and 364, the motor driver circuits 353, 366 and 368 are controlled to short the motors 150–154 to ground to thus brake the rotation of the shafts 160, 162 and 164 (FIG. 3).

A postage report generator 322 receives the shipping amount output signals from the postage calculator 300. In response to the all home signal, the postage report generator 322 provides to a printer (not shown) and to a postage report memory 324 a signal which represents an item record that may include, for example, the shipping amount and other information such as department that may be entered by the operator into the postage report generator 322 via the keyboard. The item record may be printed by the printer and the item record may also be stored in the postage report memory 324 for use later by the postage report generator as, for example, by printing shipping cost summaries when requested by the operator through the keyboard 301.

The postage computer 12 may also include a timer 326 which generates a signal on the line 319 after a predetermined time in response to the first output signal from the stamp control 320. This signal is generated in place of the signal from the meter driver 14 on the line 319 if, for example, the meter driver 14 should fail to provide the all home signal. The stamp control 320 and the postage report generator 322 respond to this signal in substantially the same fashion as described above for the all home signal.

Although the postage computer 12 and the meter driver 14 have been described above as returning the postage amount handles 198*a–c* to the zero position after the print operation is performed, it is to be noted that the handles 198*a–c* may alternately remain at the last postage amount position and be moved to the next postage amount position without first returning to the zero position. As will be recognized by those skilled in the art, the comparators 302–306 in this version of the present invention compare the signals from the postage calculator 300 with the present count of the pulse counters 308–312 which are operated as up-down counters. The comparators 302–306 then operate the control signal generators 314–318 to provide forward or reverse signals to the PROMs 350, 362 and 364 to thereby displace the shafts 132, 134 and 136 (FIG. 3) to decrease the difference between the outputs of the pulse counter 308–312 and the postage calculator 300. Once these signals are equal, the shafts 132, 134 and 136 are braked. The stamp control 320 generates the second output signal as described above only when it may be necessary to reset the postage amount handles 198*a–c* to the zero position. The timer 326 provides the signal to the postage report generator as described above.

Typical programming for the PROM 350 is disclosed in Appendix A attached hereto. The programming for the PROMs 362 and 363 is similar. The PROMs 350, 362 and 364 can be, for example, eight bit, 32 word devices as is well known to those skilled in the art. Furthermore, it is to be noted that the logic functions performed by the PROMs 350, 362 and 364 may be implemented using conventional logic circuitry.

As is described in co-pending application Ser. No. 125,099 referenced above, the letter feed sensor 22 (FIG. 1) may include the emitter/sensor assembly 374 or other detector means which sense the passage of items through the base 20 and the meter 16. The output from this encoder assembly 374 is applied to the PROMs 350, 362 and 364 which in response to this signal generate a letter feed signal on the same line 319 as the all home signal to the postage report generator 322. Thus, the postage report generator 322 is updated with the passage of each item through the base 20 and the postage meter 16, allowing accurate shipping cost summaries to be provided. For example, if a plurality of items of essentially the same weight are to be shipped, a typical item may be placed on the scale 10. The operator then operates the postage computer 12 to set the postage meter 16 through the meter driver 14 to the postage amount for the typical item. The plurality of items are then sent through the base 20 and the postage meter 16 and for each items, a letter feed signal is applied to the postage report generator 322. For each letter feed signal received by the postage report generator 322, an item record is stored into the postage report memory 324. These reports can then be summarized as described above.

Although the meter driver 14 described herein may be used with a postage meter having three postage amount handles, it is to be noted that the meter driver 14 can be adapted for use with postage meters having other than three handles.

While an exemplary embodiment of the invention has been described, it is to be understood that the invention is not limited to the details herein explained. It is expected that those skilled in the art will recognize numerous variations and equivalents which come within the spirit of the invention and which are intended to be included herein.

axially displacing the shafts to thereby move the respective handle coupling means, motor control means for controllably individually shorting each of the motors for braking the respective shaft and handle coupling means, encoder means affixed to each respective shaft, each of the encoder means having a plurality of translucent areas therein, optical sensor means for detecting the light-passing areas to thereby provide outputs indicative of positions of said shafts, control means responsive to the optical sensor means output for controlling said motor control means and for braking respective shafts and handle coupling means when the shafts reach predetermined positions, and a dollars button which travels within a guide and index means for depressing the dollars button and for riding within the guide to index the position of the device with respect to the postage meter.

APPENDIX A

| | INPUT SIGNALS | | | | OUTPUT DATA | | | | | | | |
|---|---|---|---|---|---|---|---|---|---|---|---|---|
| | Se-lect* | From Encoder Assembly 374 | From Optical Inter-rupter 238 | Re-verse* | For-ward* | To Print Actuator Tran-sistor 370 | All Home or Letter Feed | To Optical Interrupter Leds 248a–252a* | To Letter Feed Sensor Led 374* | To Tran-sis-tor 354 | To Tran-sis-tor 360 | To Tran-sis-tor 358 | To Tran-sis-tor 356 |
| Active | 0 | 0 | 0 | 0 | 0 | 1 | 0 | 0 | 0 | 0 | 0 | 1 | 1 |
| State | 0 | 0 | 0 | 0 | 1 | 0 | 0 | 0 | 0 | 0 | 1 | 1 | 0 |
| is Low | 0 | 0 | 0 | 1 | 0 | 0 | 0 | 0 | 0 | 1 | 0 | 0 | 1 |
| Level | 0 | 0 | 0 | 1 | 1 | 0 | 0 | 0 | 0 | 0 | 0 | 1 | 1 |
| (0) | 0 | 0 | 1 | 0 | 0 | 1 | 1 | 0 | 0 | 0 | 0 | 1 | 1 |
| Signal | 0 | 0 | 1 | 0 | 1 | 0 | 1 | 0 | 0 | 0 | 0 | 1 | 1 |
| | 0 | 0 | 1 | 1 | 0 | 0 | 1 | 0 | 0 | 1 | 0 | 0 | 1 |
| | 0 | 0 | 1 | 1 | 1 | 0 | 1 | 0 | 0 | 0 | 0 | 1 | 1 |
| | 0 | 1 | 0 | 0 | 0 | 0 | 1 | 0 | 0 | 0 | 0 | 1 | 1 |
| | 0 | 1 | 0 | 0 | 1 | 0 | 1 | 0 | 0 | 0 | 0 | 1 | 1 |
| | 0 | 1 | 0 | 1 | 0 | 0 | 1 | 0 | 0 | 0 | 0 | 1 | 1 |
| | 0 | 1 | 0 | 1 | 1 | 0 | 1 | 0 | 0 | 0 | 0 | 1 | 1 |
| | 0 | 1 | 1 | 0 | 0 | 0 | 1 | 0 | 0 | 0 | 0 | 1 | 1 |
| | 0 | 1 | 1 | 0 | 1 | 0 | 1 | 0 | 0 | 0 | 0 | 1 | 1 |
| | 0 | 1 | 1 | 1 | 0 | 0 | 1 | 0 | 0 | 0 | 0 | 1 | 1 |
| | 0 | 1 | 1 | 1 | 1 | 0 | 1 | 0 | 0 | 0 | 0 | 1 | 1 |
| | 1 | 0 | 0 | 0 | 0 | 0 | 1 | 1 | 1 | 0 | 0 | 1 | 1 |
| | 1 | 0 | 0 | 0 | 1 | 0 | 1 | 1 | 1 | 0 | 0 | 1 | 1 |
| | 1 | 0 | 0 | 1 | 0 | 0 | 1 | 1 | 1 | 0 | 0 | 1 | 1 |
| | 1 | 0 | 0 | 1 | 1 | 0 | 1 | 1 | 1 | 0 | 0 | 1 | 1 |
| | 1 | 0 | 1 | 0 | 0 | 0 | 1 | 1 | 1 | 0 | 0 | 1 | 1 |
| | 1 | 0 | 1 | 0 | 1 | 0 | 1 | 1 | 1 | 0 | 0 | 1 | 1 |
| | 1 | 0 | 1 | 1 | 0 | 0 | 1 | 1 | 1 | 0 | 0 | 1 | 1 |
| Water | 1 | 0 | 1 | 1 | 1 | 0 | 1 | 1 | 1 | 0 | 0 | 1 | 1 |
| Driver | 1 | 1 | 0 | 0 | 0 | 0 | 1 | 1 | 1 | 0 | 0 | 1 | 1 |
| Disabled | 1 | 1 | 0 | 0 | 1 | 0 | 1 | 1 | 1 | 0 | 0 | 1 | 1 |
| | 1 | 1 | 0 | 1 | 0 | 0 | 1 | 1 | 1 | 0 | 0 | 1 | 1 |
| | 1 | 1 | 0 | 1 | 1 | 0 | 1 | 1 | 1 | 0 | 0 | 1 | 1 |
| | 1 | 1 | 1 | 0 | 0 | 0 | 1 | 1 | 1 | 0 | 0 | 1 | 1 |
| | 1 | 1 | 1 | 0 | 1 | 0 | 1 | 1 | 1 | 0 | 0 | 1 | 1 |
| | 1 | 1 | 1 | 1 | 0 | 0 | 1 | 1 | 1 | 0 | 0 | 1 | 1 |
| | 1 | 1 | 1 | 1 | 1 | 0 | 1 | 1 | 1 | 0 | 0 | 1 | 1 |

What is claimed is:

1. A device for driving postage amount handles of a postage meter, the postage amount handles being movable along predetermined paths for setting postage amounts, the device comprising handle coupling means for receiving the respective handles, a plurality of shafts supporting the handle coupling means the shafts being supported by linear bearing means for guiding the respective shafts and handle coupling means along linear paths generally parallel to the respective predetermined paths, each of said shafts including a rack formed therein, a plurality of DC motors coupled to respective shafts through pinion drive means engaging the racks for 2. A device as in claim 1 wherein said shafts include axial grooves formed therein and said bearing means includes means for riding within the axial grooves for substantially preventing twisting of the shafts.

3. A device as in claim 1 wherein the postage meter is carried by a base and said device includes bracket means for removably affixing said device to the base and further includes a base plate pivotally hinged to the bracket means, said base plate carrying said handle coupling means, said shafts and said motor means for pivoting said handle coupling means, shaft and motor means to thereby allow access at least to said postage meter.

* * * * *